US008646047B2

(12) United States Patent
Vimpari (10) Patent No.: US 8,646,047 B2
(45) Date of Patent: Feb. 4, 2014

(54) METHOD AND APPARATUS FOR AUTHENTICATING ACCESS BY A SERVICE

(75) Inventor: Markku Kalevi Vimpari, Oulu (FI)

(73) Assignee: Nokia Corporation, Espoo (FI)

( * ) Notice: Subject to any disclaimer, the term of this patent is extended or adjusted under 35 U.S.C. 154(b) by 211 days.

(21) Appl. No.: 12/880,699

(22) Filed: Sep. 13, 2010

(65) Prior Publication Data

US 2012/0066748 A1 Mar. 15, 2012

(51) Int. Cl.
*H04L 29/06* (2006.01)
(52) U.S. Cl.
USPC .............................................. 726/4
(58) Field of Classification Search
USPC .............................................. 726/4
See application file for complete search history.

(56) References Cited

U.S. PATENT DOCUMENTS

| | | | |
|---|---|---|---|
| 7,228,417 B2 * | 6/2007 | Roskind ................ | 713/168 |
| 8,019,084 B1 | 9/2011 | Zajkowski et al. | |
| 8,024,784 B1 | 9/2011 | Issa | |
| 2004/0196972 A1 * | 10/2004 | Zhu et al. ................ | 380/45 |
| 2005/0005133 A1 | 1/2005 | Xia et al. | |
| 2006/0193473 A1 | 8/2006 | Fu | |
| 2007/0118878 A1 * | 5/2007 | Sastry et al. ................ | 726/3 |
| 2007/0208744 A1 | 9/2007 | Krishnaprasad et al. | |
| 2007/0250486 A1 | 10/2007 | Liao et al. | |
| 2007/0283424 A1 | 12/2007 | Kinser et al. | |
| 2008/0300967 A1 | 12/2008 | Buckley et al. | |
| 2009/0164782 A1 | 6/2009 | Pourzandi et al. | |
| 2010/0100950 A1 | 4/2010 | Roberts | |
| 2010/0185611 A1 | 7/2010 | Liao et al. | |
| 2010/0257600 A1 | 10/2010 | Neil et al. | |
| 2011/0188656 A1 | 8/2011 | McCullough | |
| 2011/0265189 A1 | 10/2011 | Liao et al. | |
| 2012/0054841 A1 | 3/2012 | Schultz et al. | |

FOREIGN PATENT DOCUMENTS

| | | |
|---|---|---|
| EP | 1841174 A1 | 10/2007 |
| WO | WO 2007/062672 A | 6/2007 |
| WO | WO 2010/063091 A2 | 6/2010 |
| WO | WO 2011-041916 A1 | 4/2011 |

OTHER PUBLICATIONS

U.S. Appl. No. 12/880,797, filed Sep. 13, 2010, Vimpari, Markku Kalevi.
HTTP Authentication: Basic and Digest Access Authentication, RFC 2617, Frank et al., Jun. 1999, http://www.ietf.org/rfc/rfc2617.txt, pp. 1-34.

(Continued)

*Primary Examiner* — Michael S McNally
(74) *Attorney, Agent, or Firm* — Ditthavong Mori & Steiner, P.C.

(57) ABSTRACT

An approach is presented for authenticating access by a service. The server receives a request, from a service, for the server, wherein the request includes, at least in part, a service-specific secret or a derivation of the service-specific secret. Further, the server determines to generate a server-computed secret. Then, the server determines to authenticate the request based, at least in part, on a comparison of the service-specific secret or the derivation of the service-specific secret against the server-computed secret or a derivation of the server-computed secret.
The service receives credentials from a credential manager. The secret is part of the credentials. The credential manager and the server share some secret pre-configured data like key tables. The generation of the service specific secrets is based on the shared data.

20 Claims, 7 Drawing Sheets

(56) References Cited

OTHER PUBLICATIONS

Sessionless Authentication With Encrypted Tokens, Mortoray. Accessed: Nov. 8, 2010, http://ezinearticles.com/?Sessionless-Authentication-With-Encrypted-Tokens&id=3537025, pp. 1-5.
European Communication for related European Patent Application No. 11179234.7 dated Nov. 24, 2011, pp. 1-6.
J. Franks et al., MEMO for "HTTP Authentication: Basic and digest Access Authentication", Jun. 1999, pp. 1-36.
Balfanz, Dirk, Identity in the Platform—Thinking Beyond the Browser, Apr. 2011, pp. 1-4, http://www.w3.org/2011/identity-ws/papers/idbrowser2011_submission_26.pdf.
Groupwise Trusted Application, Oct. 11, 2006, Novell, pp. 1-17, http://developernovell.com/documentation/gwtapp/pdfdoc/tapp_enu/tapp_enu.pdf.
Office Action for related U.S. Appl. No. 12/880,797 dated Dec. 7, 2012, pp. 1-24.
Communication pursuant to Article 94(3) EPC for corresponding European Patent Application No. 11 179 234.7-1856, dated Nov. 27, 2013, 4 pages.

* cited by examiner

METHOD AND APPARATUS FOR AUTHENTICATING ACCESS BY A SERVICE

BACKGROUND

Service providers and device manufacturers (e.g., wireless, cellular, etc.) are continually challenged to deliver value and convenience to consumers by, for example, providing compelling network services. One area of development of has been the integration or coordination of multiple services by enabling one service to use or access the features or functions of another service. For example, in one use case, a service provider may create a central notification service so that other services may quickly transmit or exchange messages with client applications and/or devices. In this way, these other services (i.e., the client services) need not recreate or maintain their own infrastructure to provide such a notification function, thereby significantly reducing the resource burden on the other services. However, as the popularity of service integration grows, service providers and device manufacturers face significant technical challenges to managing access from one service to another (e.g., authenticating access to ensure that only authorized services can access the features or functions of another service).

SOME EXAMPLE EMBODIMENTS

Therefore, there is a need for an approach for efficiently authenticating access to one service by another service.

According to one embodiment, a method comprises receiving a request, from a service, for a server, wherein the request includes, at least in part, a service-specific secret or a derivation of the service-specific secret. The method also comprises determining to generate a server-computed secret. The method further comprises determining to authenticate the request based, at least in part, on a comparison of the service-specific secret or the derivation of the service-specific secret against the server-computed secret or a derivation of the server-computed secret.

According to another embodiment, an apparatus comprises at least one processor and at least one memory including computer program code The at least one memory and the computer program code configured to, with the at least one processor, cause, at least in part, the apparatus to receive a request, from a service, for a server, wherein the request includes, at least in part, a service-specific secret or a derivation of the service-specific secret. The apparatus is also caused to determine to generate a server-computed secret. The apparatus is further caused to determine to authenticate the request based, at least in part, on a comparison of the service-specific secret or the derivation of the service-specific secret against the server-computed secret or a derivation of the server-computed secret.

According to another embodiment, a computer-readable storage medium carries one or more sequences of one or more instructions which, when executed by one or more processors, cause, at least in part, an apparatus to receive a request, from a service, for a server, wherein the request includes, at least in part, a service-specific secret or a derivation of the service-specific secret. The apparatus is also caused to determine to generate a server-computed secret. The apparatus is further caused to determine to authenticate the request based, at least in part, on a comparison of the service-specific secret or the derivation of the service-specific secret against the server-computed secret or a derivation of the server-computed secret.

According to another embodiment, an apparatus comprises means for receiving a request, from a service, for a server, wherein the request includes, at least in part, a service-specific secret or a derivation of the service-specific secret. The apparatus also comprises means for determining to generate a server-computed secret. The apparatus further comprises means for determining to authenticate the request based, at least in part, on a comparison of the service-specific secret or the derivation of the service-specific secret against the server-computed secret or a derivation of the server-computed secret.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for authenticating an access by a service are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
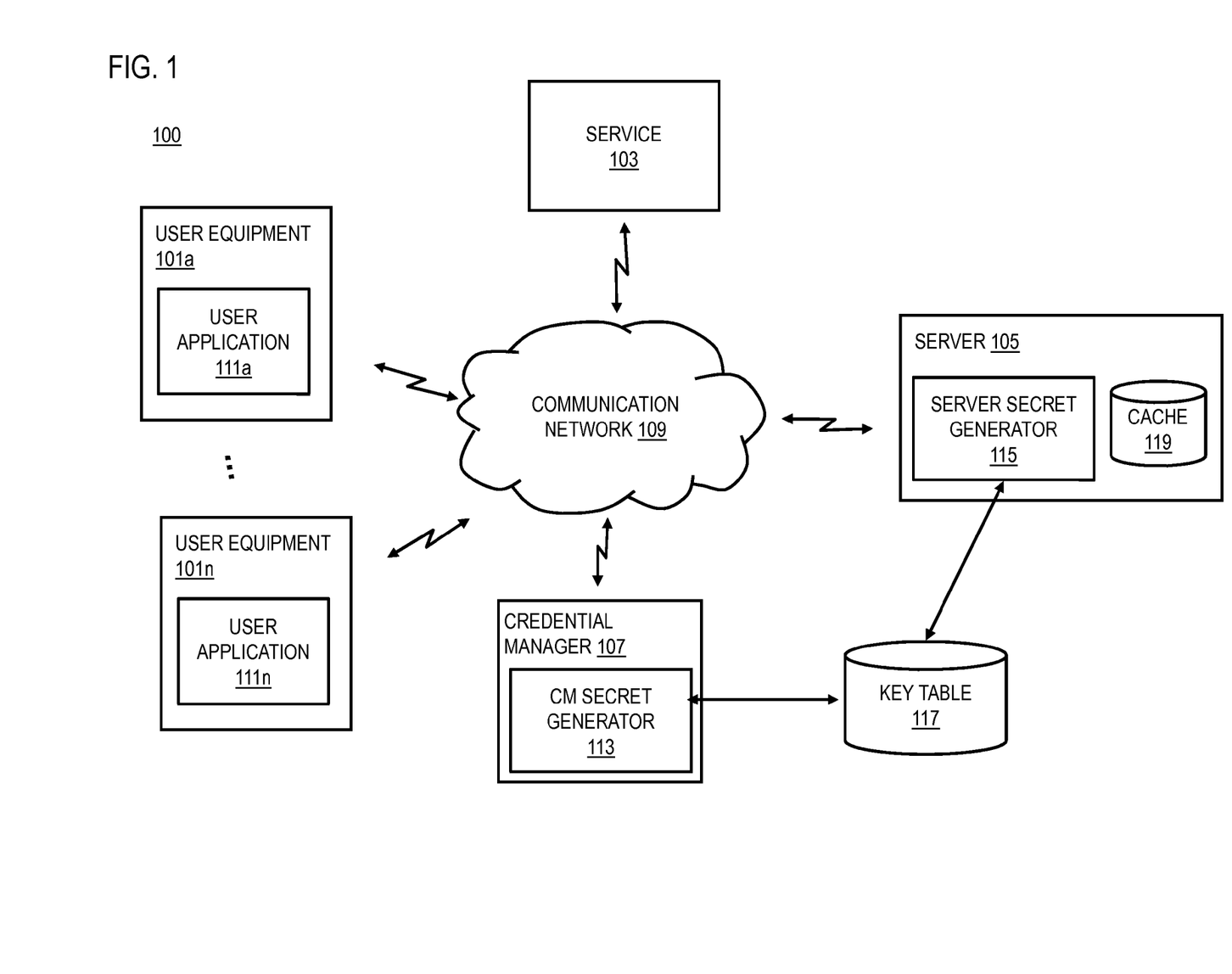
FIG. 1 is a diagram of a system capable of authenticating access by a service, according to one embodiment.

FIG. 1 is a diagram of a system capable of authenticating access by a service, according to one embodiment. As noted above, service providers are increasingly developing services with features and functions that are designed for use by or integration with other services as a way to, for instance, facilitate development of new services and reduce resource burdens on the service developers. For example, core service functions (e.g., notification services which deliver messages between a service and its client applications or devices) can be consolidated in a separate service that can then be accessed by any number of other services. As a consequence, the number of services that rely on other services to provide such core functions is rapidly increasing. It is noted that along with this increase, there is a corresponding increase in the need for authenticating access by a client service to the server(s) of another service to access such features or functions (e.g., notification functions).

In particular, there are an increasing number of third party services that need to be authenticated to access a server or a service. Traditionally, authentication between the services comprises, at least in part, generating authentication credentials (e.g., user name/password, tokens, etc.) that are stored for later reference during authentication both in the client and server sides. More specifically, a service that sends a request typically presents its authentication credentials to the service or server that it wants to access. The service or server that is being access then processes the authentication credentials for comparison against stored credentials or any derivation of the credentials like hashes. However, when the number of potential client services increases, the burden (e.g., processing resources, storage resources) associated with storing, and/or otherwise managing the credentials can be potentially significant, particularly when the service is under heavy use. For example, a notification service can potentially be used by thousands of services that generate hundreds of thousands of notifications or more, each notification subject to authentication. In some cases, as the number of client services increases, service providers often have to manage the corresponding service loads by distributing the load among multiple servers, which introduces additional complexity and inefficiencies when databases of authentication credentials also have to be distributed, synchronized, and/or otherwise managed across the multiple servers.

Furthermore, depending on the nature of the services provided, a service authentication system may also be subject to one or more preferences, restrictions, and/or requirements. For example, a notification service (e.g., as described above) often has many unique considerations. In one example, the system including a server where the services are connected to deliver notifications to the user devices is preferred to be in a different administration domain than an entity where applications and service developers reserve the service names and application names, and obtains the authentication data for their services.

Further, the traditional approach to authenticating access may require a third party service to implement a specific software development kit and non-standard software components. The traditional approach may also include other requirements for the third party service attempting to access another service. These requirements may include requiring the third service to use plain text notification requests (e.g. without transport layer security (TLS) protection), requiring the system for the third service to be able to scale seamlessly and to have a high capacity that is not be limited due to the request authentications. Further, other requirements may also include requiring the newly activated services to be able to use or access a service without delay, and to tolerate database corruption, delays or error in replication.

To address this problem, a system 100 of FIG. 1 introduces the capability to authenticate access by a service by using authentication credentials (e.g., secrets) that are dynamically generated when needed at the server authenticating the service. More specifically, the system 100 receives a request, from a service, to a server, wherein the request includes a service-specific secret or a derivation of the service-specific secret. The derivation of the service-specific secret may be some derived value of the service-specific secret like a hash. Then, the system 100 generates a server-computed secret (if not found in the cache). In one embodiment, a secret may be electronic data and may be used as a password. For example, the secret may be used as a password at a hypertext transfer protocol (HTTP) level authentication. The system 100 authenticates the request from the service to the server based on a comparison of the service-specific secret or the derivation of the service-specific secret against the server-computed secret or a derivation of the server-computed secret. For example, if the service-specific secret or the derivation of the server-computed secret sufficiently matches the server-computed secret during the authentication, then the system 100 enables the access by the service to the server.

In other words, the system 100 does not rely on storing authentication credentials for verification, but instead, uses a secret generator that may be separately implemented at the credential manager which provides the authentication credentials to the service and the server to generate or compute a secret for authenticating access. The secret generators are designed to compute identical or substantial identical pseudo random secrets based on similar inputs. In this way, the service requesting access dynamically generates its secret for authenticating access (e.g., for transmitting a notification), transmits this secret or a derivation of this secret such as a randomly derived value of this secret like a digest according to IETF specification RFC2617 to the service or server providing access (e.g., a notification server). The service or server providing access may then dynamically compute the same secret or derivation of the same secret for comparison and authentication. Accordingly, the system 100 need not store or maintain a database of authentication credentials at the server where there would be a high number of authentication credentials otherwise and a need for provisioning the data before a new service can be authenticated, thereby reducing or eliminating the resource burdens (e.g., processing resources, storage resources, etc.) and maintenance effort associated with the traditional authentication scheme discussed above.

As shown in FIG. 1, the system 100 comprises a service 103, a server 105, and a credential manager 107 via a communication network 109. In one embodiment, the system 100 may receive a request from the service 103 to the server 105. This request may include at least a service-specific secret or a derivation of the service-specific secret, which may have been generated at the credential manager 107 by the CM (credential manager) secret generator 113 based on one or more parameters. The parameters may be pre-configured between the credential manager 107 and the server 105 or otherwise parameters determined via the service 103 and/or server 105. By way of example, the parameters to be pre-configured may include a service identifier, a service level, one or more keys, auxiliary data, or a combination thereof. The secrets (e.g., the service-specific secret and the server-computed secret) or their derivations may be generated by the credential manager 107 and the server 105, respectively. The credential manager 107 and the server 105 may have be identical copy of key table 117, which is used to generate one or more keys for computing respective secrets. Thus, some of the parameters, such as the keys, may be determined from a source common to the credential manager 107 and the server 105. The key table 117 may include primary keys, and a key for the secret may be selected from the key table 117 based on the parameters such as the service identifier and the service level for the service 103. Thus, the CM secret generator 113 may compute a service-specific secret or its derivation using one or more of the keys from the key table and other parameters such as the service identifier, the service level, and auxiliary data.

Initial process of the service 103 to the credential manager 107 may be started by the service 103 sending a request to the credential manager 107 for the service identifier. The credential manager 107 may validate the request for the service credentials and check for availability of the service identifier. As discussed above, the parameters may be determined based on other parameters such that those parameters may be used to compute a secret. Then, the CM secret generator 113 in the credential manager 107 may compute a service-specific secret based on these parameters such as the key, the service identifier, and the service level for the service 103, as well as auxiliary data. In one embodiment, the auxiliary data may be a "salt" that includes random bits that are used as an input to a key derivation function. Further, the CM secret generator 113 may be a part of the credential manager 107 as shown in FIG. 1, or may be an entity separate from the credential manager 107.

When the server 105 receives the request from the service 103, the server 105 generates a server-computed secret and authenticates the request based on the comparison of the service-specific secret and the server-computed secret or their derivatives. In one embodiment, the server 105 may temporarily store or cache the computed secrets in a temporary storage (e.g., in Random Access Memory), such as a cache 119 at the server 105. In this way, the server 105 need not recomputed the secret for comparison for subsequent requests. The server 105 may maintain the secret in the cache 119 for a predetermined time, until reset, etc. It is noted that the keeping the secret in cache memory is an optional step that serves to reduce potential resource consumption used in computing the secret for each authentication request; it is contemplated that the server secret generator 115 may, in addition or alternatively, dynamically compute the secret for each request.

If the server 105 does not find the credentials (e.g., the computed secrets) for the requesting service identifier in the cache 119 at the server 105 or otherwise the server 105 does not maintain a cache, the server 105 may compute the server-computed secret based on the parameters such as the service identifier and the service level, as well as the server specific salt and/or server secret generator specific salt. These parameters may be included in this request or predetermined between the credential manager 107 and the server 105. When the server-computed secret is computed, it may be stored in a cache 119 (e.g. random access memory (RAM) cache) at the server 105. Then, the server 105 compares the service-specific secret or the derivation of the service-specific secret against the server-computed secret or the derivation of the server-computed secret, for authentication. If the service-specific secret (or its derivation) and the server-computed secret (or its derivation) sufficiently match, then the server 105 may validate the authentication and enable access by the service 103 to the server 105. In one embodiment, sufficiently match includes both an exact match or matching at least one or more portions of the secret. For example, in some cases the service computed secret may consist of several sections or portions (e.g., a several bytes of data). In one embodiment, if a first or other designated portion of the service computed secret matches the one or more portions of the server compute secret, the server 105 can determine a sufficient match.

Then the server 105 enables or grants the requested access. For example, in the case where the server 105 provides a notification service, granting access enables the service 103 to place a notification at the server 105, such that the notification from the service 103 may be delivered to the UE 101. Then, the UE 101 may display the notification by the service 103 via the user application 111.

Therefore, the advantage of this approach is that the system 100 provides a novel way to authenticate access by a service to a server by comparing secrets or their derivations like hashes computed by the credential manager and the server respectively. Because the secrets are computed based on the same key table, and other existing parameters, there is no need to maintain a database to store the secrets or having communication link or messages between the credential manager and the server. Further, the secrets may be stored in a cache such as a RAM, to improve responsiveness and reduce the computational burden associated with generating the secret. Further, this method enables the authentication of a new service, which is not recognized by the server, while reducing an operation cost (e.g. cost incurred due manual provisioning). Further, because this approach computes a secret instead of obtaining it from a database, operation time may be remarkably faster. Accordingly, means for authenticating access by a service are anticipated.

Figure 2:
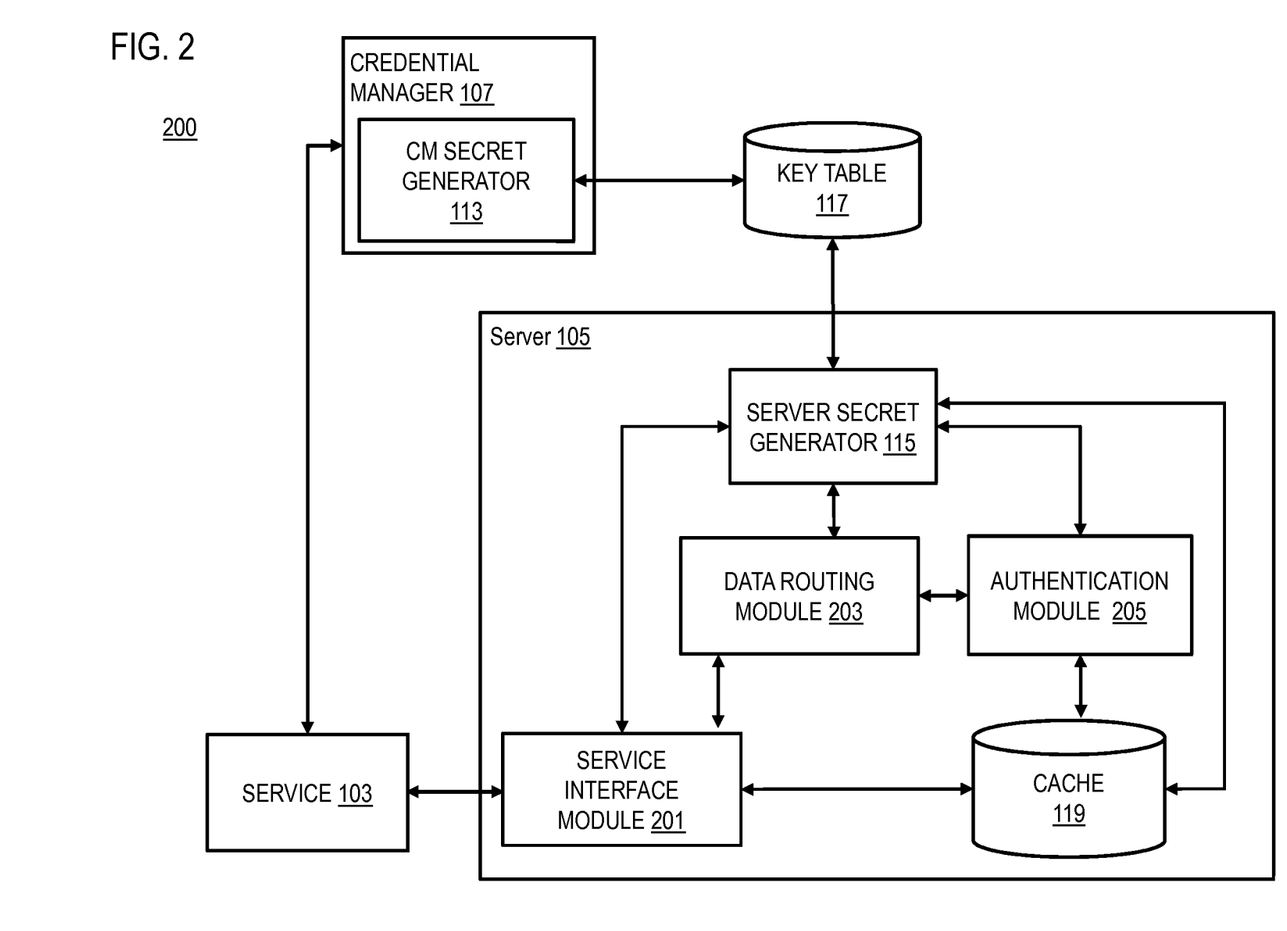
FIG. 2 is a diagram of the components of the server, according to one embodiment.

FIG. 2 is a diagram of the components of the server 105, according to one embodiment. By way of example, the server 105 includes one or more components for authenticating a request by a service to a server. It is contemplated that the functions of these components may be combined in one or more components or performed by other components of equivalent functionality. In this embodiment, the server 105 includes a server secret generator 115 as well as a service interface module 201, a data routing module 203 and an authentication module 205. The service interface module 201 provides an interface for connectivity with the service 103. The data routing module 203 manages and controls any incoming and outgoing communications such as transfer of the files or data, as well as command signals such as requests. The server secret generator 115 computes a secret based on the parameters and the key table 117. The authentication module 205 authenticates the requests from the service 103 by comparing the secrets or their derivations received from the service 103 against those ones computed by the server secret generator 115 or found from the cache 119. In one embodiment, the server 105 receives a request from the service 103 via the service interface module 201 for the server 105. This request may include the service-specific secret or a derivation of the service-specific secret. The service-specific secret may be pre-generated and provided to the service 103 for the authentication to the server 105, such that this service-specific secret may be included in the request or the authentication challenge by the server 105 may be responded with a derivation of the service specific secret as described in IETF standard RFC2617. The service-specific secret is the secret computed based on the various parameters. These parameters may be pre-configured between the credential manager 107 and the server 105, as well as the other parameters determined via the service 103, and/or the server 105 and/or the credential manager 107. These parameters may include a service identifier, a service level, one or more keys, auxiliary data, or a combination thereof. This request is communicated to the authentication module 205, which determines to generate a request to the server secret generator 115 to generate the server-computed secret in response to the request. Once the server-computed secret is generated, the authentication module 205 may compare the service-specific secret or the derivation of the service-specific secret against the server-computed secret or the derivation of the service-specific secret to authenticate the request by the service 103.

In one embodiment, to generate the service-specific secret to be used in authentication, the credential manager 107 may receive a request for a service identifier before the service 103 sends any request for the authentication to the server 105. Then, the credential manager 107 may initiate the process of the service 103 to the credential manager 107. For example, the credential manager 107 may check for the availability of the service identifier to assign to the service 103. If there is an available service identifier, the credential manager 107 assigns the service 103 with the service identifier and generates the service-specific secret via the CM secret generator 113. The credential manager 107 may include a service secret generator that computes the service-specific secret based on the parameters such as the key, the service identifier, the service level and the auxiliary data. In one example, the service-specific secret may be a hash-based message authentication code (HMAC). The primary key may be selected from the key table 117 based on a hash of the input data, wherein the input data also contains the service identifier and the service level.

As the authentication module 205 authenticates the access by the service 103 to the server 105, the authentication module 205 first checks if the service credentials for the service identifier of the service 103 are found from the cache 119. If not, the server secret generator 115 computes the server-computed secret. The server-computed secret may be generated based on the similar process used to generate the service-specific secret by the credential manager 107. Thus, the server-computed secret may be computed based on a key from the key table 117 as well as other parameters such as the service identifier, the service level, and the auxiliary data which are specific to the server 105 and the credential manager 107. After the server-computed secret has been computed, the authentication module 205 compares the service-specific secret or the derivation of the service-specific secret against the server-computed secret or the derivation of the server-computed secret, for authenticating the request to the server 105. For example, this access may be granted if the server-computed secret and the service-specific secret sufficiently match each other. This authentication may be performed via a standard HTTP authentication.

The secret such as the server-computed secret may be stored in a cache 119 in the server 105 to improve responsiveness and decrease resources used for generating secrets. Even if the secret is removed from the cache 119, the secret may be recomputed using the server secret generator 115, as described above.

Figure 3:
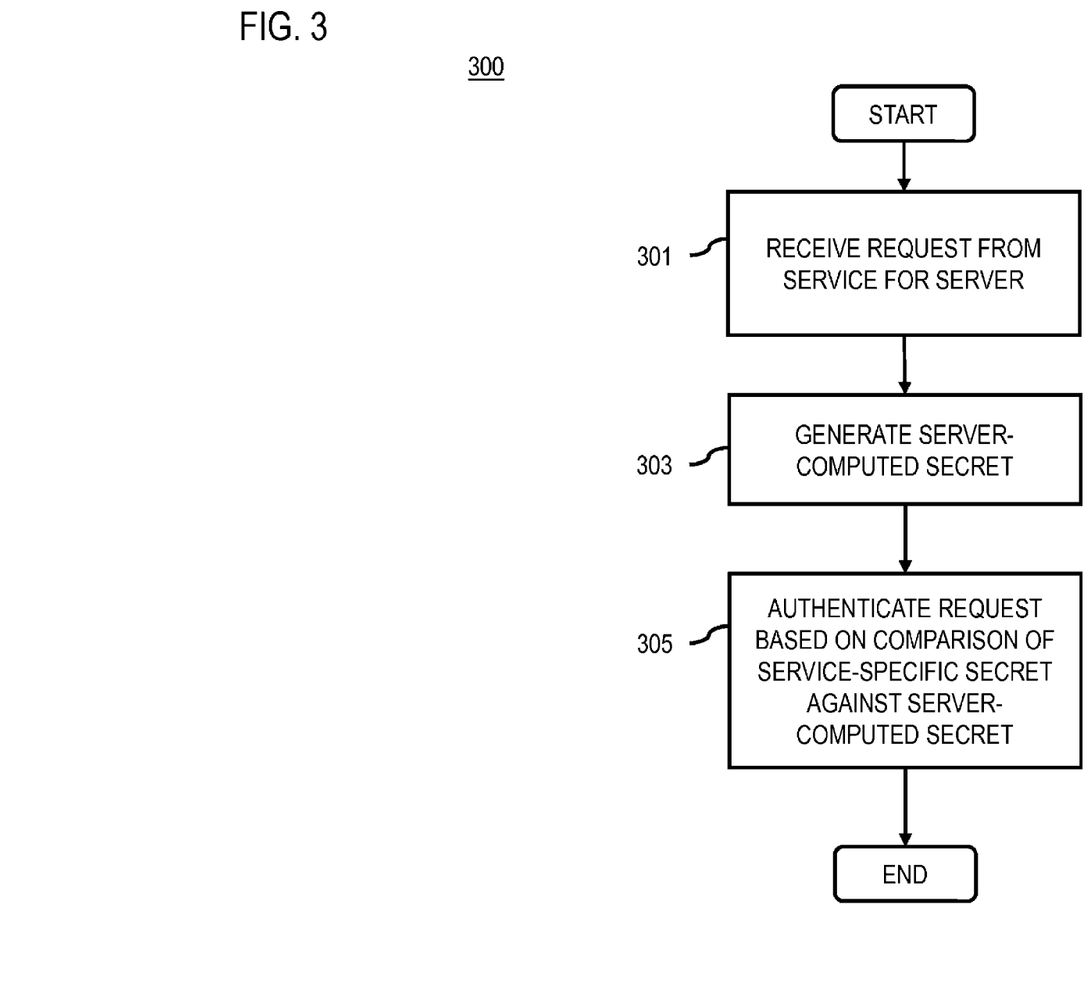
FIG. 3 is a flowchart of a process for authenticating access by a service, according to one embodiment.

FIG. 3 is a flowchart of a process for authenticating access by a service, according to one embodiment. In one embodiment, the server 105 performs the process 300 and is implemented in, for instance, a chip set including a processor and a memory as shown in FIG. 7 or computer system of FIG. 6. In step 301, the server 105 receives a request from a service 103 for a server 105, wherein the request includes, at least in part, a service-specific secret or a derivation of the service-specific secret. The request may be received from the service 103.

The service-specific secret may be pre-generated and provided to the service 103 for authentication to the server. In particular, the service 103 may request the credential manager 107 to generate the service-specific secret. The credential manager 107 is connected to or contains the key table 117, which contains a number of primary keys. In generating the service-specific secret, the credential manager 107 may first initiate the process of the service 103, which may include pre-configuring the parameters used in generating the service-specific secret. For example, the process may include the credential manager 107 checking for availability of the service identifier for the service 103. Then, the CM secret generator 113 may compute the service-specific secret for the service 103 based on these parameters such as the one or more keys, the service identifier, the service level and the auxiliary data. The service-specific secret may be a HMAC, and the key may be selected based on the hash of an input data, wherein the input data contains the service identifier and the service level. The key table may contain numerous keys so that the probability of two services utilizing the same key is small. Further, even if the primary keys selected for two services appear the same, the secrets created as the HMAC are always different.

In step 303, the server 105 determines to generate a server-computed secret in response to the request via the server secret generator. The server 105 first checks if the service credentials are found from the cache. If the server 105 determines that the credentials are not found in the cache or the server 105 does not maintain a cache then it may request the server secret generator 115 to generate a server-computed secret.

By way of example, the server-computed secret may be determined according to a similar process used to determine the service-specific secret in the credential manager. For example, the server-computed secret may pre-configure one or more parameters such as the service identifier, the service level, and salt that is specific to the server 105 and the credential manager 107. Using the key table 117, other parameters such as one or more keys may be derived based on these parameters. Thus, the key table 117 is an example of a source common to and/or shared between the credential manager 107 and the server 105. Then, the server secret generator 115 in the server 105 generates a server-computed secret based on the determined parameters. In one embodiment, the server 105 may store the server-computed secret in a cache 119 at the server 105 for subsequent reference in response to subsequent authentication requests from the server 105, such as a RAM. The server secret generator 115 may also be located separately from the server 105, or placed within the server 105. The server 105 may be connected to the key table 117 or the key table may reside within the server 105.

In step 305, the server 105 authenticates the access based, at least in part, on a comparison of the service-specific secret or the derivation of the service-specific secret against the server-computed secret or the server-computed secret. This authentication may be performed as a standard HTTP authentication. This authentication may also utilize the service identifier as well as the secrets as credentials. The authentication may be validated if there is a sufficient match between the service-specific secret or its derived value and the server-computed secret or its derived value. One example of the derived values may include hashes in the HTTP digest authentication.

In one example, the UE 101 may receive notifications from a service 103 which is a third party to the server 105 only if the request to the server 105 from the service 103 is authenticated. For instance, the service 103 requests access to the server 105 for transmitting a notification to the UE 101. The server 105 authenticates the access by comparing the service-specific secret or its derivation against the server-computed secret or its derivation, as discussed above. If the authentication is validated, then the service 103 will be granted access to the server 105, and will be able to transmit the notification via the server 105, so that the notification may be displayed at the UE 101 using, for instance, the user application 111. If the access is denied based on the authentication, then the notification will not be displayed at the UE 101 since the service 103 will not have access to transmit the notification through the server 105. This example with the notification to the UE 101 is one of many examples where the processes of FIG. 3 may be utilized.

This process is advantageous in that it provides a simple and efficient way to authenticate the access by a service to a server, by comparing a service-specific secret (or its derivation) against a server-computed secret (or its derivation). Thus, this process saves an operation cost by reducing the need for the database used to store the authentication-related information and also increases the speed of authentication because computing the secrets may be faster than retrieving the secrets from a database. The components of the server 105 are means for providing the service secret as part of it to the server and thus achieving this advantage.

Figure 4:
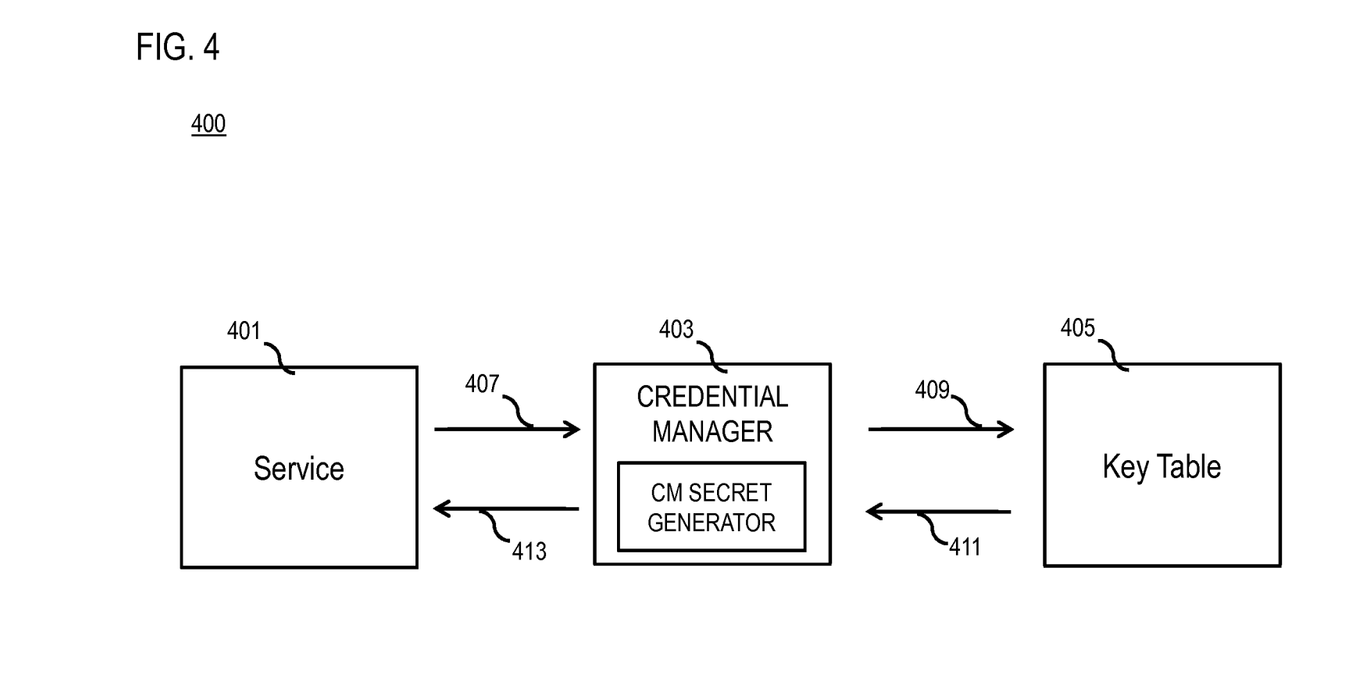
FIGS. 4-5 are block diagrams of the processes of FIG. 3, according to one embodiment.

FIGS. 4 and 5 are block diagrams of the processes of FIG. 3, according to one embodiment. FIG. 4 shows a diagram 400 with the interactions among the service 401, the credential manager 403, and the key table 405. In process 407, the service 401 sends a request for a service identifier to the credential manager 403. The credential manager 403 then validates the request and checks for availability of the service identifier. If there is an available service identifier, the credential manager 403 assigns the service identifier to the service 401. Then, in process 409 the credential manager 431 computes the service-specific secret for the service identifier, the service level and the salt, based on a key table 405. The credential manager 431 may include a credential manager (CM) secret generator that is used to generate the service-specific secret. In process 411, the credential manager 403 generates the service-specific secret based on the key table 405, and then forwards the service-specific secret to the service 401 along with the service identifier and the service level via process 413. In this embodiment, the service 410 and the key table 405 may be equated to the service 103 and the key table 117. The credential manager 403 may be equated to the credential manager 107.

Figure 5:
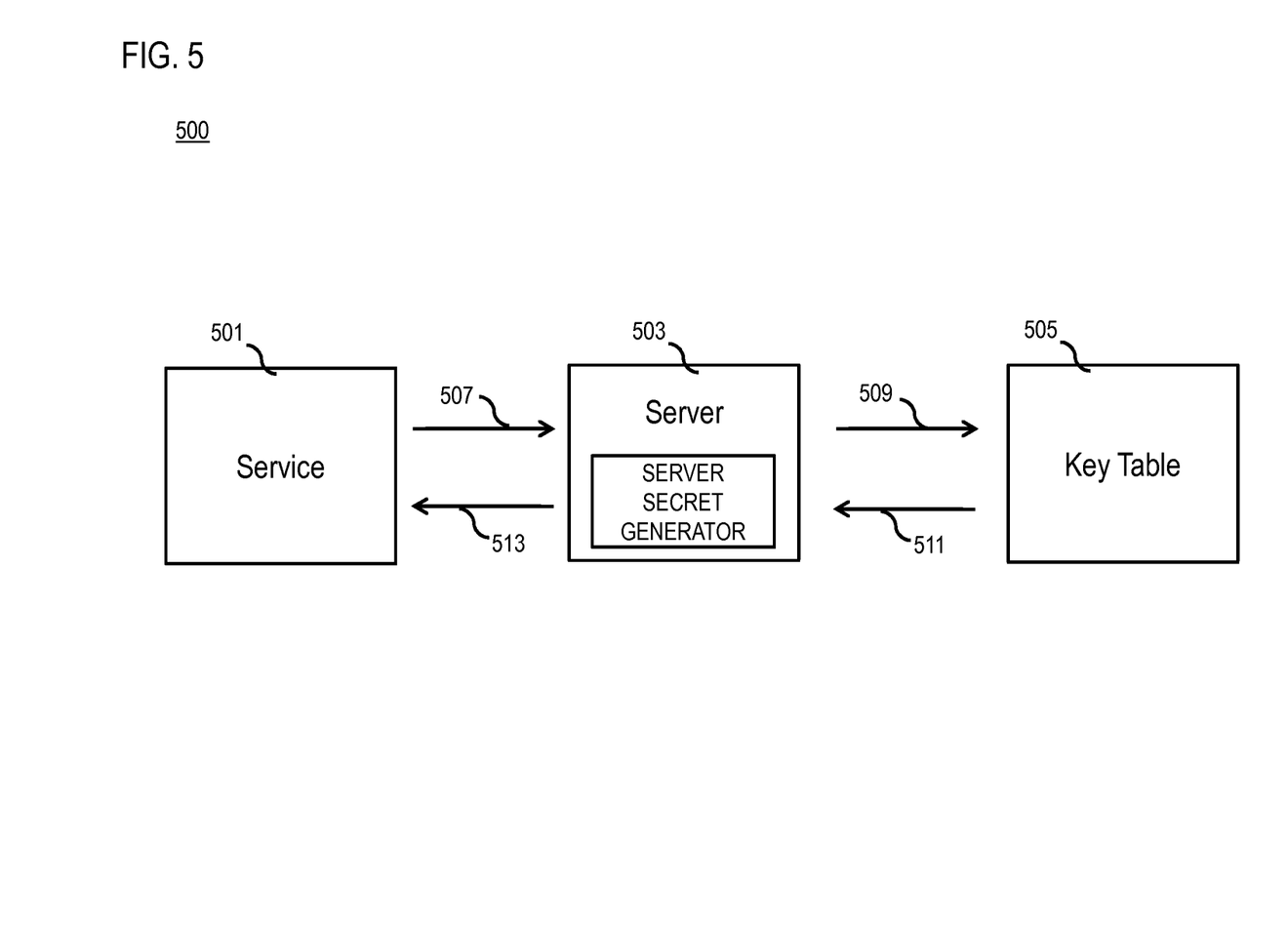

FIG. 5 shows a diagram 500 with the interactions among the service 501, the server 503, and the key table 505. The service 501 may send a request to the server 503 for access to the server 503 by the service. The request may initially include the service credentials including the service identifier received via process 413. If the server 503 does not know the credentials for the service identifier in the request, then, in process 509, it computes the server-computed secret based on the service identifier, the service level, and the salt and then sends the server-computed secret to the server 503, based on the key table 505. The server may include a server secret generator that is used to generate the server-computed secret. The server 503 generates the server-computed secret based on the key table 505, via process 511. During the process 511, the server-computed secret may be stored in a cache (e.g. cache 119 of FIG. 1), such as a RAM at the server 503. Then, the server 503 performs authentication by comparing the server-computed secret and the service specific secret or derived values of them e.g. hashes, via the HTTP plain or http digest authentication. The result of the authentication is sent to the service 501 in process 513 to indicate whether the service 501's request is accepted by the server 503 or not.

The processes described herein for authenticating access by a service may be advantageously implemented via software, hardware, firmware, or a combination of software and/or firmware and/or hardware. Such exemplary hardware for performing the described functions is detailed below.

Figure 6:
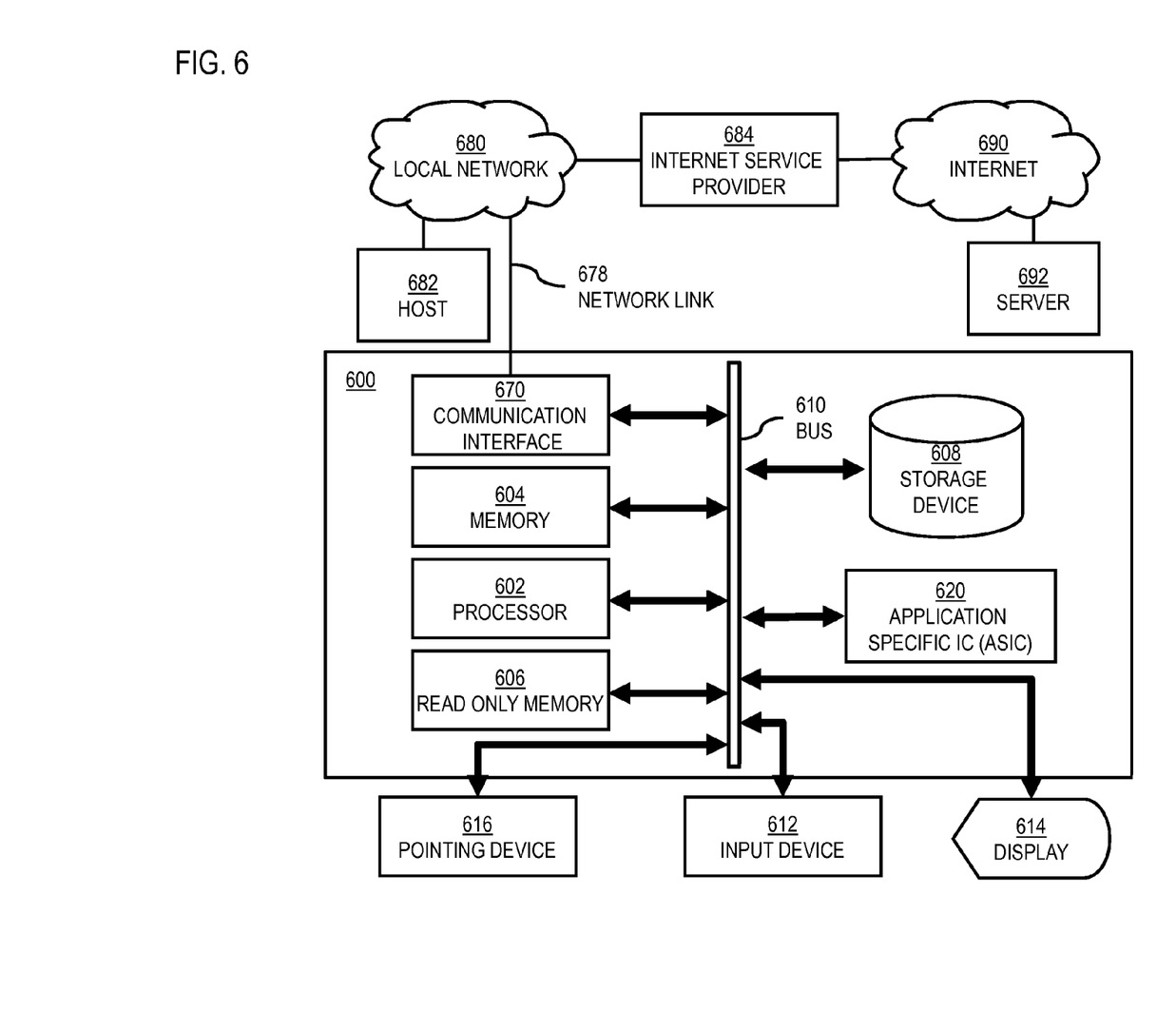
FIG. 6 is a diagram of hardware that can be used to implement an embodiment of the invention.
Figure 7:
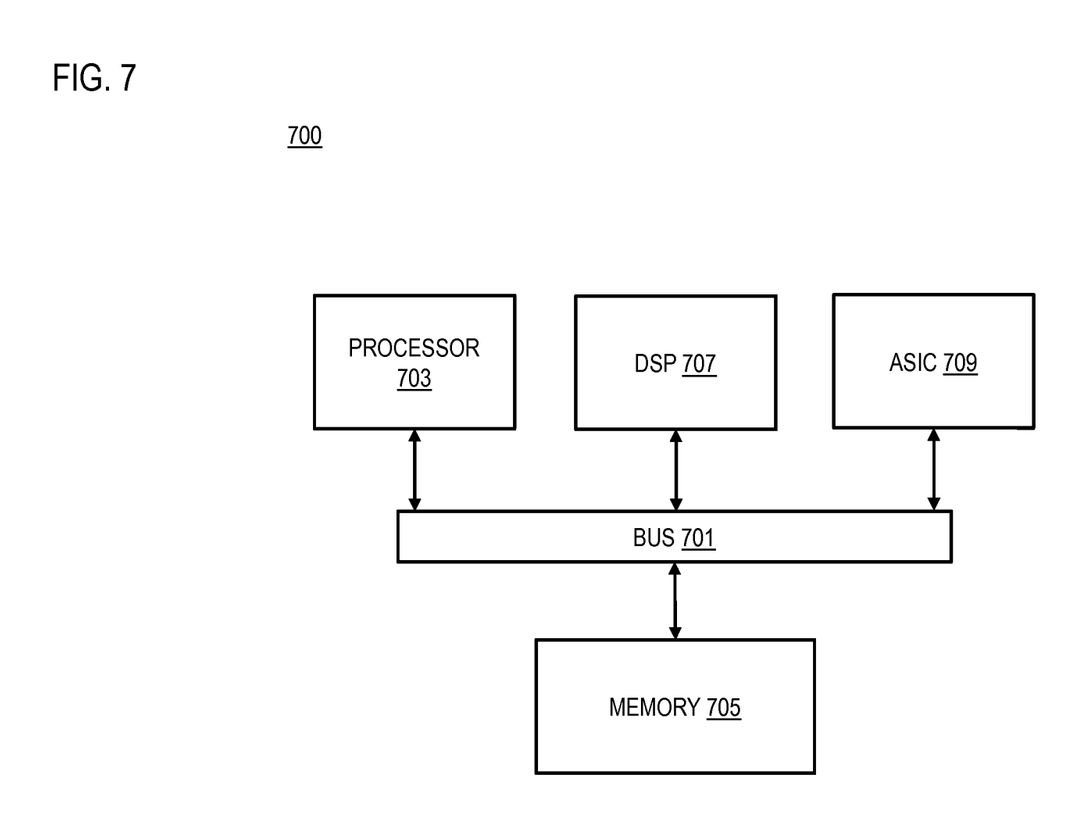
FIG. 7 is a diagram of a chip set that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to authenticate access by a service as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic, and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of authenticating access by a service.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to authenticating access by a service. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations includes bringing information in from the bus 610 and placing information on the bus 610. The set of operations also typically includes comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for authenticating access by a service. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670 carry information to and from computer system 600. Computer system 600 can send and receive information, including program code, through the networks 680 and 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data, or both, to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to authenticate access by a service as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of authenticating access by a service.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to authenticate access by a service. The memory 705 also stores the data associated with, or generated by, the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a request from a service for a server, wherein the request includes, at least in part, a service-specific secret or a derivation of the service-specific secret based, at least in part, on a service level and a key table;
    determining to generate a server-computed secret based, at least in part, on the key table; and
    determining to authenticate the request based, at least in part, on a comparison of the service-specific secret or the derivation of the service-specific secret against the server-computed secret or a derivation of the server-computed secret.

2. A method of claim 1, wherein the service-specific secret is pre-generated and provided to the service for the authentication to the server.

3. A method of claim 1, wherein the service-specific secret and the server-computed secret are generated based, at least in part, on independent instances of a secret generator.

4. A method of claim 1, wherein one or more parameters are pre-configured, and wherein the service-specific secret and the server-computed secret are generated based, at least in part, on the one or more parameters.

5. A method of claim 4, wherein one or more other parameters are determined based, at least in part, on the one or more parameters, the one or more other parameters determined via the service, the server, a credential manager, or a combination thereof, and
    wherein the service-specific secret, the server-computed secret, or a combination thereof is further based, at least in part, on the one or more other parameters.

6. A method of claim 5, wherein the one or more other parameters are determined from a source common to the credential manager and the server.

7. A method of claim 5, wherein the one or more parameters, the one or more other parameters, or a combination thereof includes, at least in part, a service identifier, one or more keys, auxiliary data, or a combination thereof 8. A method of claim 1, further comprising:
    determining to cache the server-computed secret at the server,
    wherein the determining to authenticate the request is based, at least in part, on the cached server-computed secret.

9. An apparatus comprising:
    at least one processor; and
    at least one memory including computer program code for one or more programs,
    the at least one memory and the computer program code configured to, with the at least one processor, cause the apparatus to perform at least the following, receive a request from a service for a server, wherein the request includes, at least in part, a service-specific secret or a derivation of the service-specific secret based, at least in part, on a service level and a key table;

determine to generate a server-computed secret based, at least in part, on the key table; and determine to authenticate the request based, at least in part, on a comparison of the service-specific secret or the derivation of the service-specific secret against the server-computed secret or a derivation of the server-computed secret.

10. An apparatus of claim 9, wherein the service-specific secret is pre-generated and provided to the service for the authentication to the server.

11. An apparatus of claim 9, wherein the service-specific secret and the server-computed secret are generated based, at least in part, on independent instances of a secret generator.

12. An apparatus of claim 9, wherein one or more parameters are pre-configured, and,
wherein the service-specific secret and the server-computed secret are generated based, at least in part, on the one or more parameters.

13. An apparatus of claim 12, wherein one or more other parameters are determined based, at least in part, on the one or more parameters, the one or more other parameters determined via the service, the server, the credential manager, or a combination thereof, and
wherein the service-specific secret, the server-computed secret, or a combination thereof is further based, at least in part, on the one or more other parameters.

14. An apparatus of claim 13, wherein the one or more other parameters are determined from a source common to the credential manager and the server.

15. An apparatus of claim 13, wherein the one or more parameters, the one or more other parameters, or a combination thereof includes, at least in part, a service identifier, one or more keys, auxiliary data, or a combination thereof 16. An apparatus of claim 9, wherein the apparatus is further caused to:
determine to cache the server-computed secret at the server,
wherein the determination to authenticate the request is based, at least in part, on the cached server-computed secret.

17. A method comprising facilitating access to at least one interface configured to allow access to at least one service, the at least one service configured to perform at least the following:
receiving a request from a service for a server, wherein the request includes, at least in part, a service-specific secret or a derivation of the service-specific secret based, at least in part, on a service level and a key table;
determining to generate a server-computed secret based, at least in part, on the key table; and
determining to authenticate the request based, at least in part, on a comparison of the service-specific secret or the derivation of the service-specific secret against the server-computed secret or a derivation of the server-computed secret.

18. A method of claim 17, wherein the service-specific secret and the server-computed secret are generated based, at least in part, on independent instances of a secret generator.

19. A method of claim 17, wherein one or more parameters are pre-configured, and
wherein the service-specific secret and the server-computed secret are generated based, at least in part, on the one or more parameters.

20. A method of claim 17, wherein one or more other parameters are determined based, at least in part, on the one or more parameters, the one or more other parameters determined via the service, the server, the credential manager, or a combination thereof, and
wherein the service-specific secret, the server-computed secret, or a combination thereof is further based, at least in part, on the one or more other parameters.

* * * * *